(12) United States Patent
Horie et al.

(10) Patent No.: US 12,235,282 B2
(45) Date of Patent: Feb. 25, 2025

(54) AUTOMATIC ANALYZER

(71) Applicant: Hitachi High-Tech Corporation, Tokyo (JP)

(72) Inventors: Yosuke Horie, Tokyo (JP); Manabu Ochi, Tokyo (JP); Tetsuji Kawahara, Tokyo (JP); Kohei Nonaka, Tokyo (JP); Hiroyuki Takayama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 991 days.

(21) Appl. No.: 17/279,224

(22) PCT Filed: Oct. 8, 2019

(86) PCT No.: PCT/JP2019/039672
§ 371 (c)(1),
(2) Date: Mar. 24, 2021

(87) PCT Pub. No.: WO2020/095604
PCT Pub. Date: May 14, 2020

(65) Prior Publication Data
US 2022/0034928 A1    Feb. 3, 2022

(30) Foreign Application Priority Data
Nov. 6, 2018    (JP) .................................. 2018-208844

(51) Int. Cl.
*G01N 35/10*    (2006.01)
*B06B 1/02*    (2006.01)
(Continued)

(52) U.S. Cl.
CPC ....... *G01N 35/1004* (2013.01); *B06B 1/0207* (2013.01); *B08B 3/12* (2013.01);
(Continued)

(58) Field of Classification Search
CPC ..... B06B 1/0207; B06B 1/06; B06B 2201/55; B06B 2201/71; B08B 3/12; B08B 3/102;
(Continued)

(56) References Cited

U.S. PATENT DOCUMENTS

2018/0161829 A1    6/2018 Horie et al.

FOREIGN PATENT DOCUMENTS

JP    2003-207433 A    7/2003
JP    2010133727 A  *  6/2010
(Continued)

OTHER PUBLICATIONS

International Search Report of PCT/JP2019/039672 dated Dec. 10, 2019.

*Primary Examiner* — Matthew D Krcha
*Assistant Examiner* — Austin Q Le
(74) *Attorney, Agent, or Firm* — MATTINGLY & MALUR, PC

(57) ABSTRACT

Provided is an automated analyzer comprising an ultrasonic cleaner capable of obtaining a consistent cleaning effect regardless of the operating temperature environment. This automated analyzer comprises: a dispensing mechanism having a nozzle for dispensing a sample or reagent; an ultrasonic cleaner 26 for cleaning the nozzle; and a control unit 28. The ultrasonic cleaner comprises: a cleaning tank 206; an ultrasonic vibrator 205; and a vibration head 209 that extends from the ultrasonic vibrator to the cleaning tank and has a distal end part that is inserted into the cleaning tank. The control unit inserts the nozzle into the cleaning tank and carries out a heating operation for heating the ultrasonic vibrator by driving the ultrasonic vibrator according to a driving condition different from that for a cleaning operation for cleaning the nozzle by driving the ultrasonic vibrator.

11 Claims, 7 Drawing Sheets

(51) Int. Cl.
  *B08B 3/12* (2006.01)
  *B08B 13/00* (2006.01)
  *B06B 1/06* (2006.01)
  *G01N 35/00* (2006.01)

(52) U.S. Cl.
  CPC ............... *B08B 13/00* (2013.01); *B06B 1/06* (2013.01); *B06B 2201/55* (2013.01); *B06B 2201/71* (2013.01); *G01N 2035/00346* (2013.01)

(58) Field of Classification Search
  CPC ............... B08B 13/00; G01N 35/1004; G01N 2035/00346; G01N 2035/0444
  See application file for complete search history.

(56) References Cited

FOREIGN PATENT DOCUMENTS

| | | | |
|---|---|---|---|
| JP | 2018-048892 A | 3/2018 | |
| WO | WO-2017002740 A1 * | 1/2017 | ............... B08B 3/12 |

* cited by examiner

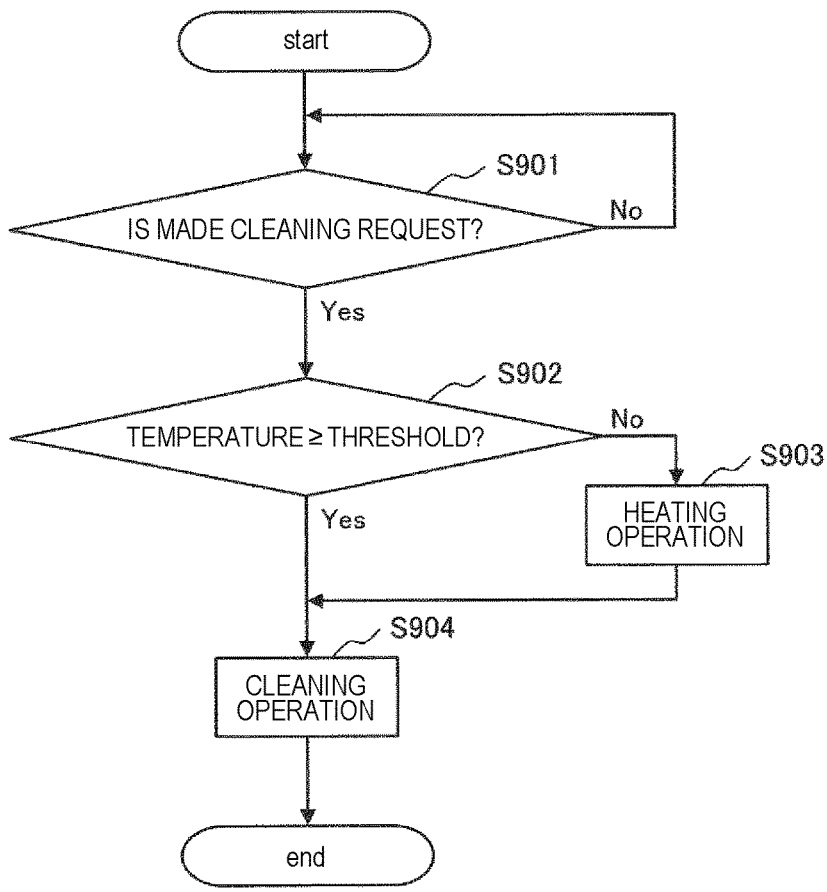
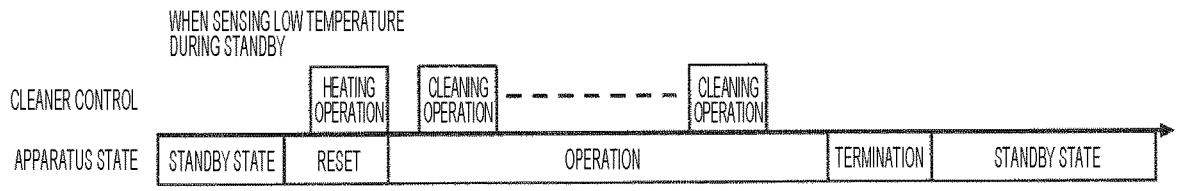
FIG. 10
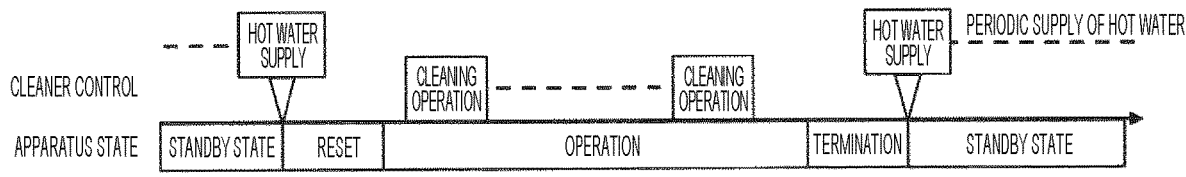
FIG. 11

AUTOMATIC ANALYZER

TECHNICAL FIELD

The present invention relates to an automatic analyzer equipped with an ultrasonic cleaner that cleans a nozzle that dispenses a sample or reagent such as serum or urine.

BACKGROUND ART

In an automatic analyzer, the same nozzle is repeatedly used to dispense the samples. Therefore, the tip of the nozzle is cleaned before sucking another sample. If the tip of the nozzle is not sufficiently cleaned, the component of the previous sample is carried over to the next sample, and the measurement accuracy is worsened. However, the automatic analyzer having a high throughput performance performs the dispensing process at a high speed. Therefore, sufficient time is not spent for cleaning the nozzle. In order to clean the nozzle more effectively, PTL 1 discloses a technique for removing stains (residues of a previous sample) attached to a nozzle by an ultrasonic cleaner which uses a bolt-clamped Langevin type transducer (BLT) in which a piezoelectric device is sandwiched between metal blocks.

CITATION LIST

Patent Literature

PTL 1: WO 2017/002740

SUMMARY OF INVENTION

Technical Problem

As mentioned above, the ultrasonic cleaner used in the automatic analyzer cannot use a sufficient cleaning time, so it is necessary to obtain a cleaning effect in a short time of about 1 to several seconds. In PTL 1, a vibration head is provided at the tip of the BLT, and the vibration head is resonated and vibrated in the cleaning solution to generate a large displacement, thereby obtaining a cavitation effect around the nozzle in a short time. However, the piezoelectric device used in the BLT is affected by the ambient temperature, and when the temperature of the piezoelectric device changes, the characteristics of the piezoelectric device also change. Therefore, as will be described later, a phenomenon in which the vibration amplitude is not constant has been found. Sufficient vibration may not be obtained, or the cleaning solution may scatter to the surroundings due to a sudden change in vibration. If the cleaning solution to be used is an alkaline cleaning solution or the like, the scattered liquid will precipitate and stain the device.

It has been found that such anomalous vibrations tend to occur at low temperatures. The automatic analyzer is often used in a temperature-controlled room, but the temperature may be low depending on the season, place of use, and time of use. Therefore, it is desired that a stable cleaning effect can be obtained without depending on the operating temperature environment.

Solution to Problem

An automatic analyzer according to an embodiment of the present invention includes a dispensing mechanism having a nozzle for dispensing either a sample or a reagent, an ultrasonic cleaner to clean the nozzle, and a controller. The ultrasonic cleaner includes a cleaning bath, an ultrasonic transducer, and a vibration head which extends from the ultrasonic transducer toward the cleaning bath to cause a tip of the vibration head to be inserted into the cleaning bath. The controller performs a heating operation of driving the ultrasonic transducer to heat the ultrasonic transducer under drive condition which is different from that of a cleaning operation of cleaning the nozzle by inserting the nozzle into the cleaning bath and driving the ultrasonic transducer.

Advantageous Effects of Invention

Provided is an automatic analyzer including an ultrasonic cleaner capable of obtaining a consistent cleaning effect regardless of the operating temperature environment.

Other objects and novel features will become apparent from the description of the specification and the accompanying drawings.

BRIEF DESCRIPTION OF DRAWINGS

FIG. 9 represents an example flow of a heading determination of the ultrasonic cleaner.
FIG. 10 is a time chart of heating control on an ultrasonic transducer in a third embodiment.
FIG. 11 is a time chart of heating control on an ultrasonic transducer in a fourth embodiment.

DESCRIPTION OF EMBODIMENTS

Figure 1:
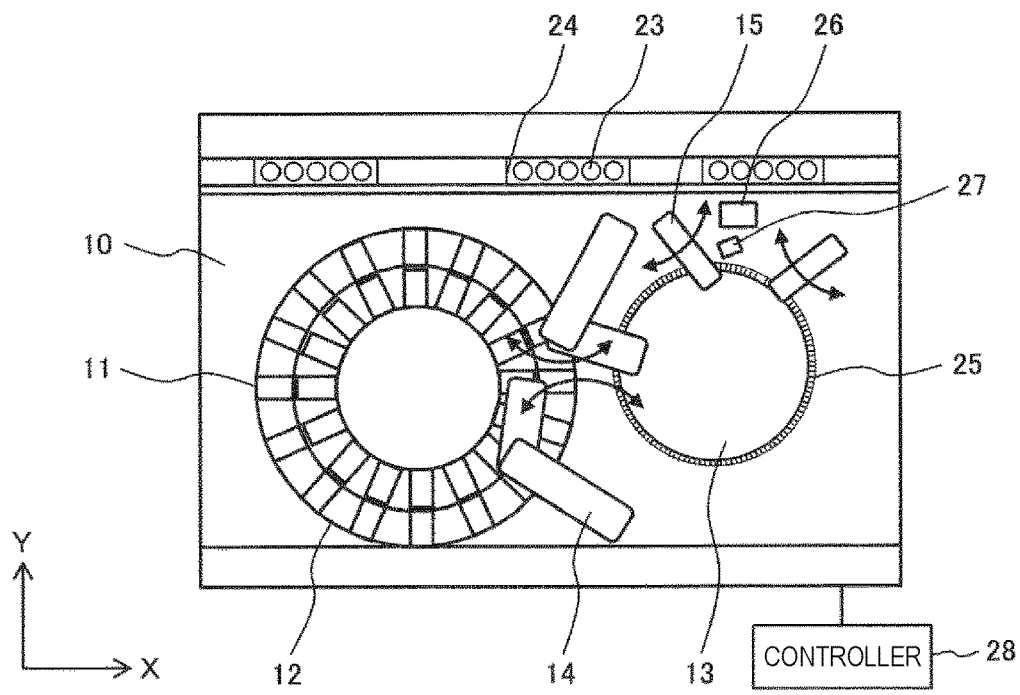
FIG. 1 represents an example configuration (top view) of an automatic analyzer.

FIG. 1 is a diagram illustrating the configuration of an automatic analyzer. An automatic analyzer 10 includes main mechanisms, that is, a reagent disk 12 which mounts a plurality of reagent containers 11, a reaction disk 13 in which cells 25 are arranged in a circumferential shape and a reagent and a sample are mixed by the cell 25 to measure the reaction, a reagent dispensing mechanism 14 which sucks and discharges the reagent, and a sample dispensing mechanism which sucks and discharges the sample. The reagent dispensing mechanism 14 includes a reagent nozzle to dispense the reagent (not illustrated), and the sample dispensing mechanism 15 includes a sample nozzle to dispense the sample (not illustrated). The sample inserted to the automatic analyzer is mounted in a rack 24 and conveyed in the state of being contained in a sample container (test pipe) 23. A plurality of sample containers 23 are mounted in the rack 24. Further, the sample is a sample taken out of blood such as serum or whole blood, or urine. A controller 28 controls the entire automatic analyzer.

The sample dispensing mechanism 15 rotatably moves the nozzle to a suction position where the sample is sucked from the sample container 23, a discharge position at which the discharge to the cell 25 is performed, a first cleaning position where the tip of the nozzle is cleaned by a ultrasonic cleaner 26, and a second cleaning position where a cleaning bath 27 is arranged to clean the tip of the nozzle with water. Further, the sample dispensing mechanism 15 falls down the nozzle to meet the heights of the sample container 23, the cell 25, the ultrasonic cleaner 26, and the cleaning bath 27 at the suction position, the discharge position, and the cleaning position. The automatic analyzer 10 performs photometry on the mixture of the sample and the reagent contained in the cell 25 so as to analyze a concentration of a predetermined component in the sample.

Here, an operating state in which the automatic analyzer 10 can perform concentration analysis is called an operation state, and a hibernation state in which the analysis is not performed is called a standby state. The automatic analyzer 10 performs a reset operation when returning from the standby state to the operation state, and performs an end operation when shifting from the operation state to the standby state. The reset operation includes positioning and warming up of each mechanism such as the reagent disk 12 and the reagent dispensing mechanism 14 to the initial position. For example, the ultrasonic cleaner 26 stores water in the cleaning bath in the standby state, and executes an operation of replacing the water in the cleaning bath with a cleaning solution in the reset operation. This is because when an alkaline cleaning solution is used in the ultrasonic cleaner, it is desirable to store water in the cleaning bath in the standby state because the above-mentioned precipitation is likely to occur if the cleaning solution is stored in the cleaning bath for a long time. Therefore, in the end operation, the operation of replacing the cleaning solution in the cleaning bath with water is executed. In addition, when cleaning the nozzle of the sample dispensing mechanism 15 in the end operation, there is more time to spare, unlike the operation state in which processing is performed at high speed, so ultrasonic cleaning is performed for a longer time than the ultrasonic cleaning in the operation state.

In this embodiment, cleaning the nozzle of the sample dispensing mechanism 15 with the ultrasonic cleaner 26 will be described below as an example. The automatic analyzer includes an operation unit connected to the controller 28 for operating the device and a unit for the inspection engineer to put in and take out the rack 24, but this is omitted in FIG. 1.

Figure 2A:
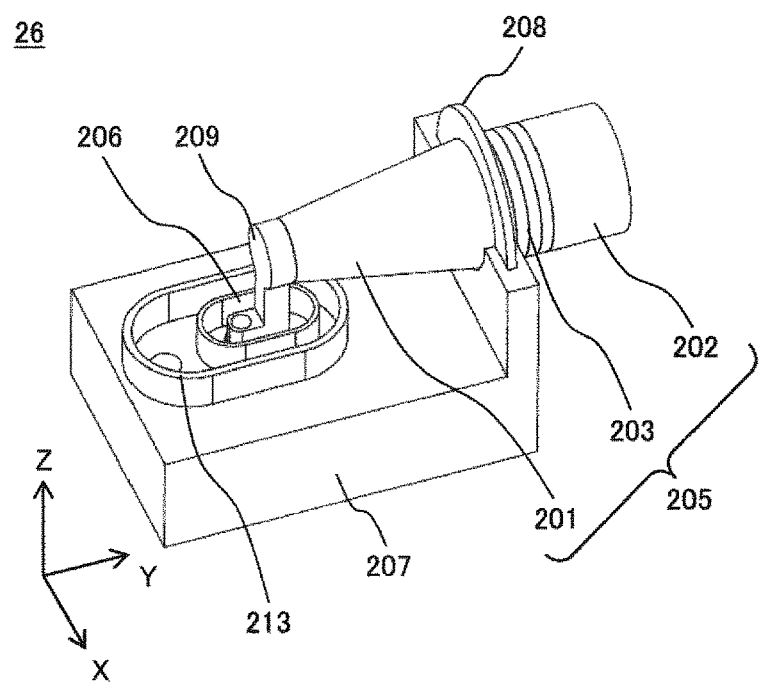
FIG. 2A represents an example configuration of an ultrasonic cleaner.
Figure 2B:
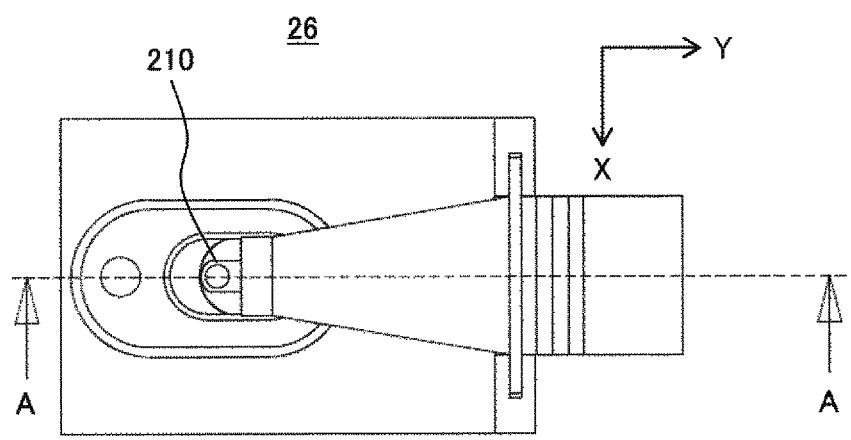
FIG. 2B represents an example configuration of the ultrasonic cleaner.
Figure 2C:
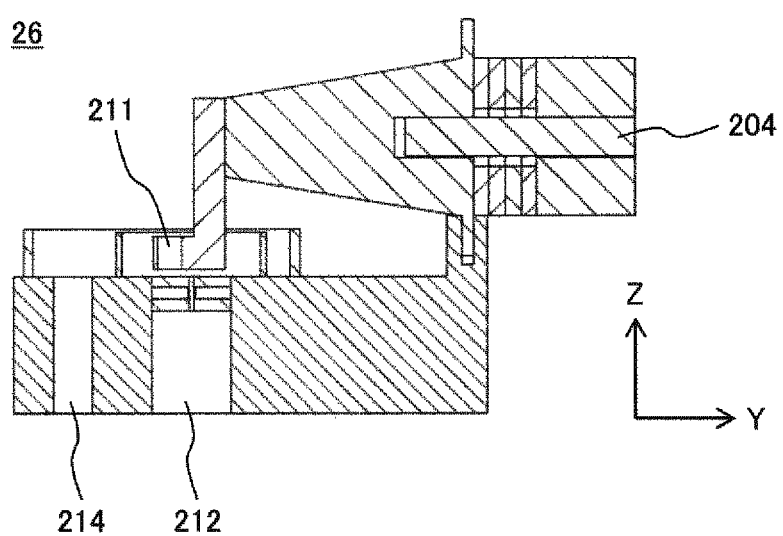
FIG. 2C represents an example configuration of the ultrasonic cleaner.
Figure 2D:
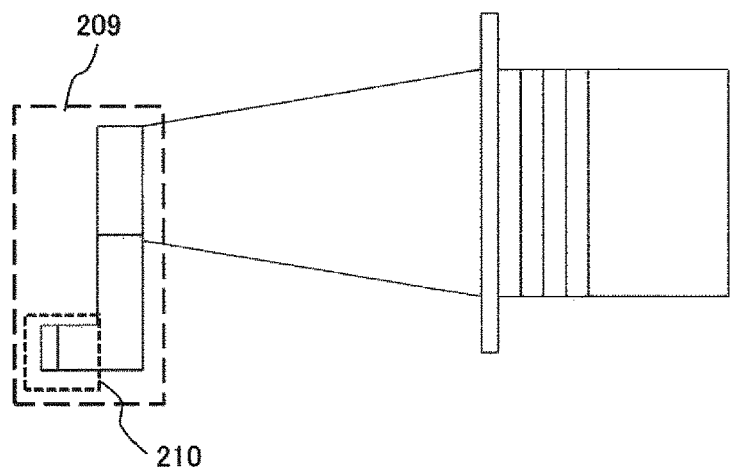
FIG. 2D represents an example configuration of the ultrasonic cleaner.

FIGS. 2A to 2D illustrate an example of the configuration of the ultrasonic cleaner 26 of this embodiment. FIG. 2A is a perspective view of the ultrasonic cleaner 26, FIG. 2B is a top view, FIG. 2C is a sectional view, and FIG. 2D is a side view of a ultrasonic transducer and a vibration head of the ultrasonic cleaner 26. The ultrasonic cleaner 26 includes one or more piezoelectric devices 203 interposed between a front mass 201 and a back mass 202, a ultrasonic transducer (BLT: Bolt-clamped Langevin Type Transducer) 205 which is configured by connecting the front mass 201 and the back mass 202 with a bolt 204, and a base 207 which fixes the ultrasonic transducer 205 and includes a cleaning bath 206 to store the cleaning solution. The ultrasonic transducer 205 includes a flange 208, and fixed to the base 207. Further, a vibration head 209 extending to the cleaning bath 206 is provided at the tip of the ultrasonic transducer 205. A tip 210 of the vibration head 209 has a cylindrical shape and is immersed in the cleaning solution (or water) of the cleaning bath 206. The tip 210 of the vibration head 209 does not come into contact with the cleaning bath 206. The tip 210 of the vibration head 209 is provided with a cylindrical hole 211 having a diameter larger than the outer diameter of the tip of the nozzle of the sample dispensing mechanism to be cleaned. In addition, a piping 212 is provided in the cleaning bath 206 to supply the cleaning solution, and supplies a constant amount of cleaning solution, so that the cleaning solution in the cleaning bath 206 overflows and can be replaced. When the height of the edge of the cleaning bath 206 is exceeded, the supplied liquid overflows from the cleaning bath 206, flows to a liquid receptacle 213 on the outer periphery of the cleaning bath 206, and is discharged from a drain channel 214. As a result, the height (liquid level) of the liquid in the cleaning bath 206 becomes constant each time the liquid is supplied.

In the drawing, only the lower side of the flange 208 is fixed to the base 207, but it is desirable that the upper side of the flange 208 is pressed from above with a member that can be connected to the base 207, and the entire circumference of the flange 208 is evenly fixed.

Further, electrode plates (for example, copper plates) are interposed between metal blocks 201 and 202 and the piezoelectric devices 203 and between the plurality of piezoelectric devices 203. When a sinusoidal voltage of a predetermined frequency is applied to these electrodes, the ultrasonic transducer 205 is driven in the axial direction of the bolt 204. The tip of the horn-shaped front mass 201 has the elongated vibration head 209 extending to the cleaning bath 206, and the tip 210 of the vibration head 209 can further expand the vibration of the tip of the horn and generate a large displacement.

The ultrasonic cleaner 26 having such a configuration is driven (generating ultrasonic vibration) at a frequency at which the impedance of the ultrasonic transducer 205 is the lowest among the frequencies of 20 to 100 kHz. As a result, the tip 210 of the vibration head 209 in the cleaning bath 206 generates a large displacement vibration (the frequency is the same as the drive frequency), and cavitation occurs around the tip 210 of the vibration head 209 immersed in the cleaning solution. In particular, cavitation occurs in the cylindrical hole 211 inside the tip 210, so that the nozzle tip can be cleaned intensively.

That is, when the nozzle is cleaned by the ultrasonic cleaner 26, the piezoelectric device 203 is driven at a frequency of 20 to 100 kHz, the nozzle is inserted to the cylindrical hole 211 of the tip 210 of the vibration head 209 such that the cleaning range of the nozzle (a range of about 5 mm from the tip of the nozzle) is immersed, and immersed in the cleaning solution for a certain time. Therefore, the contamination attached to the outer periphery of the nozzle is removed by cavitation. The ultrasonic cleaner 26 of this embodiment can generate strong cavitation due to the displacement expansion effect of the vibration head 209. After cleaning, the nozzle is pulled out, the cleaning solution is automatically replaced. Therefore, when the nozzle is cleaned next, the cleaning can be performed with the new cleaning solution, and carry-over can be suppressed.

Figure 3A:
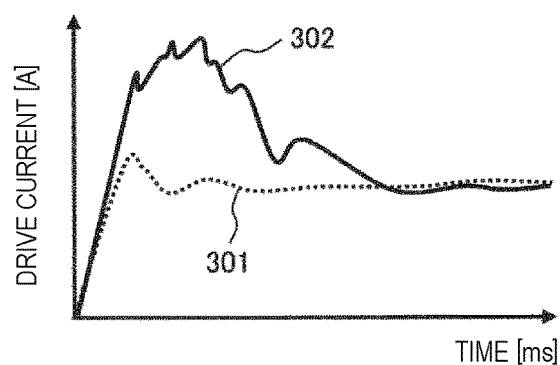
FIG. 3A represents an example of measurement result of drive current of the ultrasonic cleaner.

FIG. 3A illustrates an example of a drive current waveform that flows when driving the ultrasonic cleaner 26. In the ultrasonic cleaner 26, when a drive voltage (target voltage) is applied in a stepped manner, the vibration head 209 suddenly starts vibrating with a large displacement immediately after the start of drive, so that the cleaning solution in the cleaning bath 206 is likely to scatter. Therefore, when driving the ultrasonic cleaner 26, an application method in which the drive voltage is gradually increased from 0 V to the target voltage is desirable. However, in the studies by the inventors, it has been found that even if the same drive voltage is applied, the actual vibration state of the vibration head 209 varies. FIG. 3A is an example of a drive current waveform that flows when the same drive method is used, in which the drive voltage is increased from 0 V to the target applied voltage. Here, as described above, since it is desirable to use the resonance frequency at which the operating efficiency of the ultrasonic transducer 205 is high as the drive frequency for driving the ultrasonic transducer 205, the drive amplifier to which the drive voltage is applied has a function of tracking the resonance frequency at which the impedance is the lowest in the predetermined frequency range.

The drive current waveform when the vibration head of the ultrasonic cleaner 26 vibrates normally is a waveform 301 (dotted line). In this case, the drive current increases as the drive voltage increases and settles at a predetermined drive current (steady current) after reaching the target voltage, but the deviation from the steady current is not so large even in the transient period. On the other hand, the drive current waveform may take a waveform 302 (solid line), and the vibration head of the ultrasonic cleaner 26 shows a vibration state different from the normal vibration state. In this case, even if the target voltage is reached, a higher drive current (overcurrent) continues to flow compared to the normal drive current waveform 301, and after reaching the current peak, the overcurrent state is resolved, and finally settled to the steady current equivalent to the waveform 301. Since the drive voltage is the same, when an overcurrent occurs, the vibration amplitude of the vibration head 209 during that period is amplified more than the design specifications. Therefore, when illustrating such a drive current waveform, there is a high possibility that the vibration of the vibration head 209 scatters the cleaning solution in the cleaning bath 206. In fact, the time during which the drive current overshoots once to reach the maximum current value and then returns to the steady current is a timing at which the cleaning solution in the cleaning bath 206 is likely to scatter. The variation of the drive current waveform is not limited to that illustrated in FIG. 3A, and for example, a waveform in which the overcurrent state continues for a long time may be generated. The nozzle cleaning time of the ultrasonic cleaner 26 in the operation state is given only a very short time in order to increase the throughput of the automatic analyzer 10. Therefore, it is an important issue that the vibration head of the ultrasonic cleaner 26 can be stably vibrated according to the design specifications, including the transient period, within the nozzle cleaning period of an extremely short time (preferably less than 1 second).

Figure 3B:
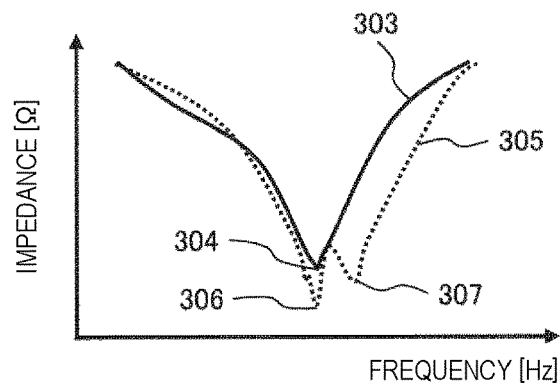
FIG. 3B represents an example of measurement results of impedance waveform of the ultrasonic cleaner.

The inventors have found that there is a relationship between the occurrence of variation in the vibration state of the ultrasonic cleaner 26 and the ambient temperature. FIG. 3B illustrates an example of the impedance measurement results of the ultrasonic cleaner 26 at low temperature (15° C.) and normal temperature (25° C.). To measure the impedance, an impedance analyzer has been used to record the impedance value at each frequency while changing the drive frequency to the ultrasonic transducer 205. The impedance waveform at room temperature is a waveform 303 (solid line), and the impedance waveform at low temperature is a waveform 305 (dotted line). The impedance waveform 305 at low temperature has two resonance points (306, 307) at which the impedance becomes low, which is lower than the impedance of a resonance point 304 at room temperature. When the impedance decreases, the drive current increases for the same drive voltage.

As described above, the drive amplifier that drives the ultrasonic transducer 205 has a function of tracking the resonance frequency at which the impedance of the ultrasonic transducer becomes a minimum value. For example, in the design specifications, it is supposed that the ultrasonic transducer 205 is driven at the resonance point 304. However, as illustrated in FIG. 3B, the impedance characteristics of the ultrasonic transducer 205 differ depending on the ambient temperature. Therefore, the vibration head shows a vibration state different from a desired vibration, for example, by being driven at the resonance point 306 or the resonance point 307. Alternatively, the tracking resonance frequency may move between a plurality of resonance points (for example, the resonance point 306 and the resonance point 307) for some reason, or may move from the resonance point 306 or the resonance point 307 to the resonance point 304 due to a temperature change. Thus, the vibration state of the vibration head changes discontinuously. As described above, it has been confirmed that the variation in the impedance characteristics of the piezoelectric device due to the ambient temperature is a major factor in the variation in the vibration state of the ultrasonic cleaner 26.

When the ambient temperature, and therefore the temperature of the piezoelectric device, changes, the impedance characteristics of the piezoelectric device change. Specifically, when the piezoelectric device is cooled, the impedance value decreases and acts in the direction of increasing the drive current, which tends to cause an overcurrent state as illustrated in FIG. 3A. Therefore, by causing heat generation of the ultrasonic transducer 205 (particularly, the piezoelectric device 203), it is possible to suppress the occurrence of an overcurrent state in the drive current waveform even in a low temperature environment. As a result, a desired vibration state can be stably obtained regardless of the ambient temperature. In order to heat the piezoelectric device 203, the piezoelectric device 203 is driven separately from the nozzle cleaning in this embodiment. However, it is necessary to prevent side effects such as scattering of the cleaning solution due to this drive. For example, the following methods are possible.

(1) It has a function of switching to a voltage lower than the target voltage at the time of cleaning in the operation state or a drive frequency deviated from the extreme value (resonance point) of the impedance characteristic, and the ultrasonic transducer 205 is driven at a low drive voltage or at a drive frequency different from the resonance frequency at the time of heating operation. Alternatively, it may be driven with a low drive voltage and a drive frequency different from the resonance frequency. As a result, the vibration amplitude of the vibration head 209 can be reduced, and the piezoelectric device 203 can be driven and heated while the liquid scattering is suppressed.

Figure 4:
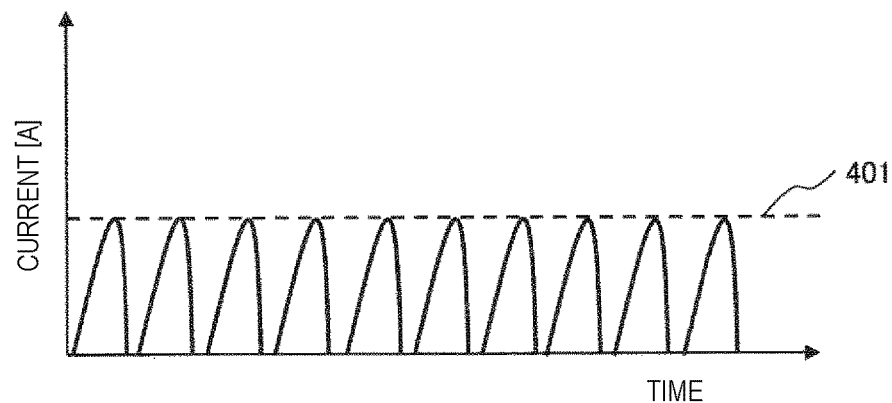
FIG. 4 represents an example method of driving an ultrasonic transducer.

(2) When the drive current becomes overcurrent, the control circuit cuts off the drive current and performs drive control that outputs only a certain current value or less. Since the ultrasonic cleaner 26 monitors the state of the ultrasonic transducer 205 with the drive current, the control is switched to the overcurrent cutoff only during the heating operation. In addition, as illustrated in FIG. 4, control may be performed so that the On/Off switching is repeated so that the drive current becomes equal to or less than the normal steady current value. In this method, a timing at which the overcurrent state occurs is grasped in advance from the drive current waveform illustrated in FIG. 3A, and the voltage application is controlled to be turned off in the time zone before the normal steady current value 401 is exceeded.

(3) The liquid in the cleaning bath 206 is drawn in once, and the ultrasonic transducer 205 is driven in the state where there is no liquid in the cleaning bath 206. Since the load of the ultrasonic transducer 205 is smaller than that during normal operation when there is no liquid in the cleaning bath 206, the vibration amplitude of the vibration head 209 increases. If the vibration head 209 generates a vibration amplitude larger than expected, it may lead to a failure of the ultrasonic transducer 205. Therefore, when this method is applied, it is desirable that the drive voltage is switched to a voltage for when there is no liquid (the drive voltage lower than the drive voltage during normal drive) and the driving is performed, or the driving is performed at a drive frequency shifted from the resonance point, or at a low drive voltage and a drive frequency different from the resonance frequency.

(4) After replacing the cleaning solution in the cleaning bath 206 with water once, the ultrasonic transducer 205 is driven. If it is water, it will not pollute the surroundings of the ultrasonic cleaner 26 even if it is scattered.

According to any of the above driving methods, the driving can be performed for heating the ultrasonic transducer 205 without adverse effects due to the scattering of the cleaning solution in the cleaning bath 206.

First Embodiment

Figure 5:
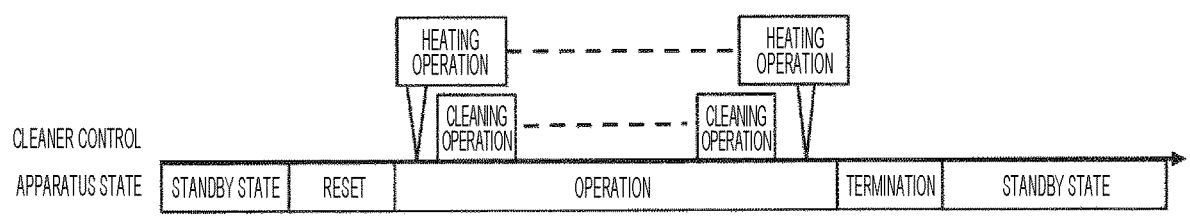
FIG. 5 is a time chart of heating control on the ultrasonic transducer in a first embodiment.

FIG. 5 is a time chart of heating control for preventing the temperature of the ultrasonic transducer in a first embodiment from dropping. As described above, the state of the automatic analyzer includes the standby state and the operation state, and each state transition has the reset operation and the end operation. In the operation state, the cleaning bath 206 is filled with the cleaning solution, and in the standby state, the cleaning solution in the cleaning bath 206 is replaced with water and waits in order to suppress the precipitation that occurs when an alkaline cleaning solution is used as the cleaning solution. In this embodiment, an example in which an alkaline cleaning solution is used as the cleaning solution is illustrated, but it can be carried out regardless of the type of the cleaning solution.

In the example illustrated in FIG. 5, in order to suppress the temperature drop of the piezoelectric device of the ultrasonic transducer in the operation state, the heating operation is started when shifting from the standby state to the operation state, and then the heating operation is continued in a time zone other than a time when the nozzle cleaning operation is performed in the operation state. For example, the ultrasonic transducer is heated by continuously driving at a voltage lower than the drive voltage at the time of cleaning. By driving at a low voltage, the vibration amplitude of the vibration head 209 becomes smaller than when the drive voltage at the time of cleaning is applied, and the temperature drop of the ultrasonic transducer 205 is suppressed without scattering the cleaning solution stored in the cleaning bath 206. Further, since it is driven at a low voltage, the amount of cavitation generated in the cleaning bath 206 is reduced, and the influence on the life of the ultrasonic cleaner 26 can be reduced.

Figure 6:
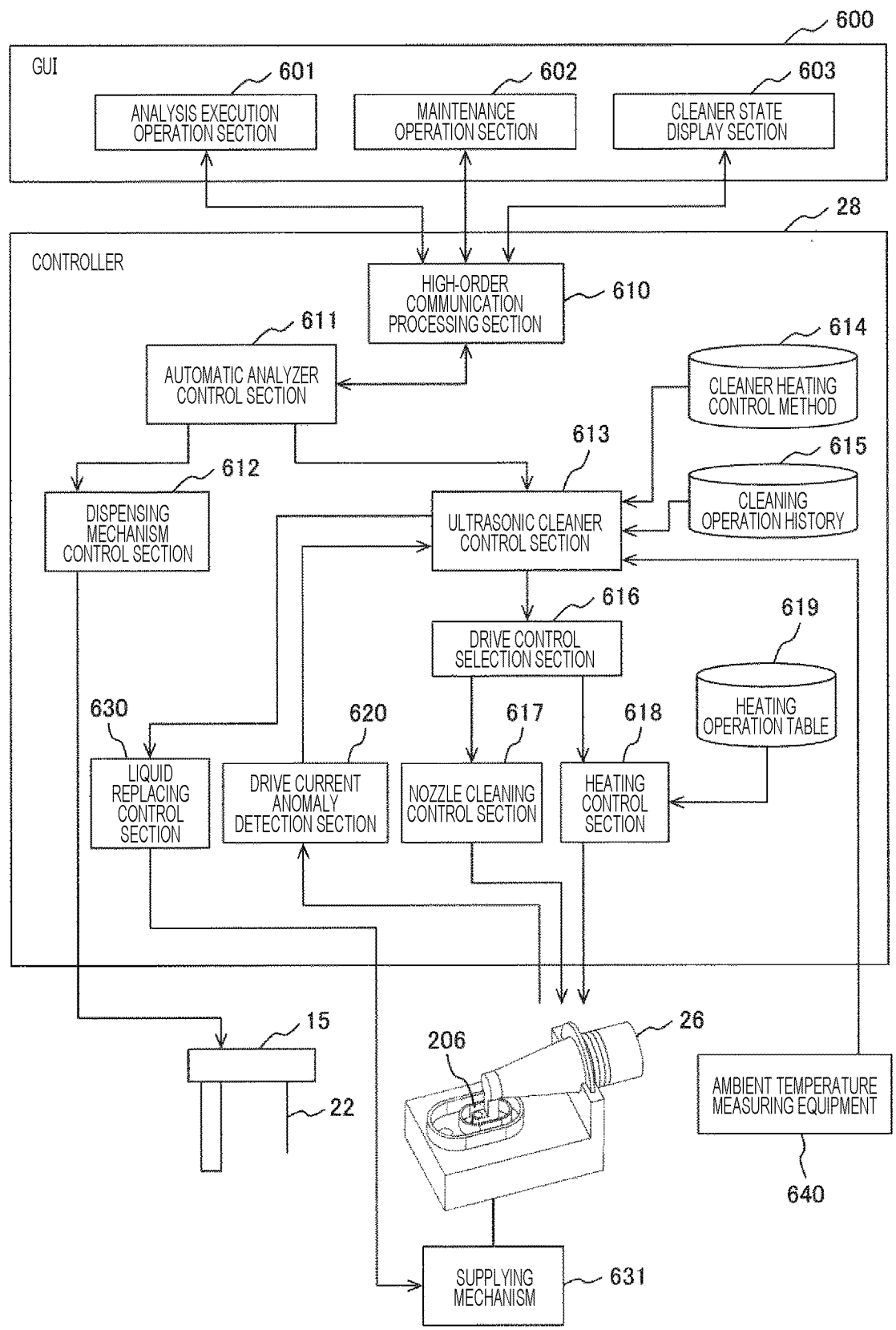
FIG. 6 represents an example configuration of a control block for performing cleaning operation and heating operation of the ultrasonic cleaner.

FIG. 6 illustrates a configuration example of the dispensing mechanism of the automatic analyzer 10 provided with the ultrasonic cleaner having a heating control function and the controller 28 of the ultrasonic cleaner. Each functional block of the controller 28 is implemented as a program that operates on a computer or a control board that realizes the controller 28.

The automatic analyzer 10 has a GUI 600, and includes an analysis execution operation section 601 for executing inspection, a maintenance operation section 602 for changing maintenance or setting of the automatic analyzer, and a cleaner state display section 603 for displaying the state of the ultrasonic cleaner 26. When a plurality of heating control methods can be applied to the automatic analyzer 10, the maintenance operation section 602 can be switched by selecting one of cleaner heating control methods 614 registered in the controller 28. The automatic analyzer 10 may be equipped with only one type of heating control method, and in this case, switching is not required. In addition to this, the setting temperature at which a serviceman starts the heating operation, which will be described later, can be set from the maintenance operation section 602, or the detailed operation contents in the heating operation can be registered in a heating operation table 619. In the heating operation table 619, for example, the driving time and the number of driving times of the ultrasonic transducer 205 can be registered for each ambient temperature.

The controller 28 that controls the device receives a command from the GUI 600 through a high-order communication processing section 610, and an automatic analyzer control section 611 controls the dispensing mechanism 15, the ultrasonic cleaner 26, and the like. An ultrasonic cleaner control section 613 controls the ultrasonic cleaner 26. As will be described later, when the heating control of the ultrasonic cleaner 26 is executed based on the temperature of the piezoelectric device of the ultrasonic transducer, the ultrasonic cleaner control section 613 can determine whether the heating operation is necessary based on the ambient temperature acquired from an ambient temperature measuring equipment (temperature sensor) 640. It is also possible to estimate the temperature of the ultrasonic transducer 205 from a cleaning operation history 615 in the past (for example, from several hours ago to the present time) and determine whether the heating operation is necessary.

When the inspection is executed, the automatic analyzer control section 611 issues a command to a dispensing mechanism control section 612 to insert a dispensing nozzle 22 of the dispensing mechanism 15 into the cleaning bath 206, and cleans the dispensing nozzle 22 by the ultrasonic cleaner 26 according to a drive command from the ultrasonic cleaner control section 613. The replacement of the cleaning solution after cleaning and the replacement operation of the cleaning solution with water performed while the device is on standby are performed by a liquid replacing control section 630 controlling a supplying mechanism 631 that supplies the cleaning solution or water to the cleaning bath 206.

A nozzle cleaning control section 617 and a heating control section 618 are switched and controlled by a command from the ultrasonic cleaner control section 613 to a drive control selection section 616. As described above, since the control operation and control parameters of the ultrasonic cleaner 26 differ between the nozzle cleaning operation and the heating operation, the drive control selection section 616 sets the switching of the control circuit or the control parameters. Specifically, the drive voltage and the drive frequency are switched, and when the drive current is controlled as illustrated in FIG. 4, the control circuit that executes the control for overcurrent cutoff is switched.

The nozzle cleaning control section 617 executes the cleaning operation that causes cavitation in the liquid in the cleaning bath 206 by the vibration of the vibration head 209 in order to remove dirt from the dispensing nozzle 22.

The heating control section 618 executes a driving operation of the ultrasonic transducer 205 for heating the piezoelectric device. At this time, the heating control section 618 cuts off the drive at a low voltage and the overcurrent according to the setting of the drive control selection section 616. When the overcurrent is not cut off, a drive current anomaly detection section 620 can confirm whether the drive current waveform of the ultrasonic cleaner 26 is higher than the normal value. The ultrasonic cleaner control section 613 can perform the additional heating control based on the abnormality information of the drive current. Further, when cleaning the dispensing nozzle 22, the cleaning operation of the ultrasonic cleaner 26 can be stopped by the nozzle cleaning control section 617 based on the abnormality information of the drive current.

In the time chart of FIG. 5, an example is illustrated in which the heating operation is continuously driven at a voltage lower than the drive voltage at the time of cleaning. However, the driving may be performed at a drive frequency different from the resonance frequency, or at a low drive voltage and a drive frequency different from the resonance frequency. Also in this case, the temperature drop of the ultrasonic transducer 205 can be suppressed without scattering the cleaning solution stored in the cleaning bath 206.

Figure 7:
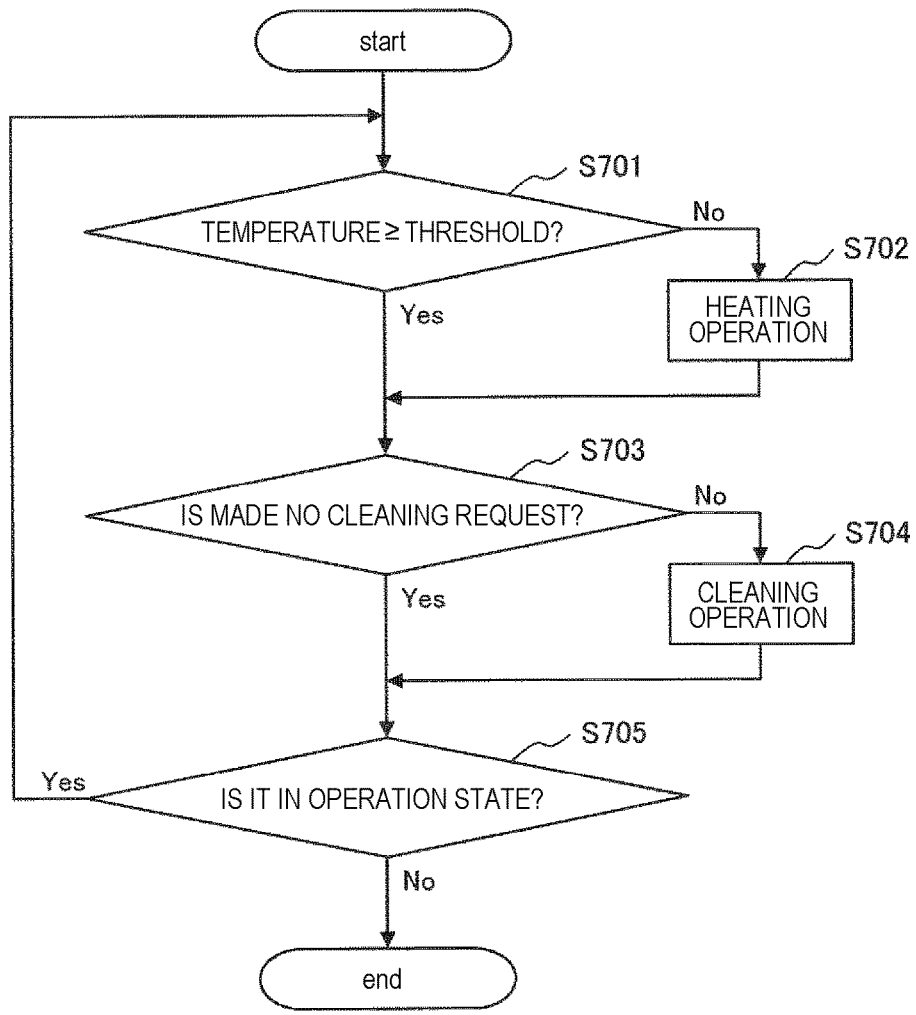
FIG. 7 represents an example flow of a heading determination of the ultrasonic cleaner.

Further, the execution of the heating control may be controlled by the temperature of the ultrasonic transducer instead of always performing the heating control in the operation state. This is because, depending on the usage environment, the ultrasonic transducer 205 may become hotter than necessary due to the heating operation, and in this case, wasteful heat is generated. FIG. 7 illustrates an example of the determination processing of the heating operation execution in the ultrasonic cleaner control section 613. In this determination process, the execution/stop of the heating operation is switched according to the ambient temperature during the operation. As the heating operation, it is appropriate to use the above-mentioned (1) low voltage drive and/or non-resonance frequency drive, (2) overcurrent cut, or a combination of (1) and (2). A threshold temperature for determining whether to execute the heating operation is set in advance. It is determined whether the temperature measured by the ambient temperature measuring equipment 640 is above the set threshold temperature (S701). When the temperature is less than the threshold temperature, the heating operation is performed (S702). When the temperature is equal to or more than the threshold temperature, the heating operation is not performed (S702). When there is a cleaning request, the cleaning operation is performed (S704) without the heating operation according to the determination of the cleaning request (S703). The above flow is repeated as long as it is in the operation state (S705). As described above, it is also possible to determine whether the heating operation is necessary based on the cleaning operation history.

At this time, in the heating operation (S702), it is desirable to switch the heating time and the number of heating times depending on the ambient temperature. For example, when the ambient temperature is 18° C. and when the ambient temperature is 22° C., the energy required for room temperature is different, and the more total driving time (the product of one drive time and the number of driving times) is necessary when the ambient temperature is 18° C. than when it is 22° C. Therefore, it is desirable to determine the heating operation parameters (time and number of times) to be used from the heating operation table 619 at the measurement timing (S701) of the ambient temperature. Further, since the heating value of the ultrasonic transducer 205 varies from individual to individual, the heating operation table 619 may be updated by measuring the heating value of the ultrasonic transducer 205 at the timing of device shipment or the reset operation. The heating value can be determined from the driving time when the drive current waveform changes.

Second Embodiment

The apparatus configuration of this embodiment is the same as that of the first embodiment, but the control method for heating the piezoelectric device 203 is different.

Figure 8:
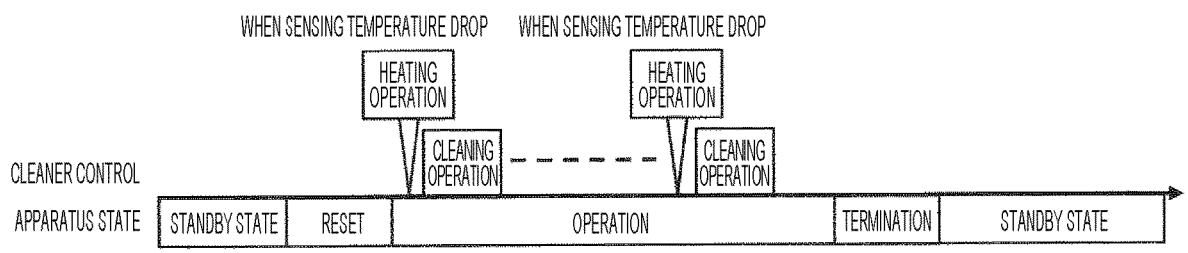
FIG. 8 is a time chart of heating control on an ultrasonic transducer in a second embodiment.

FIG. 8 is a time chart of heating control for preventing the temperature of the ultrasonic transducer in the second embodiment from dropping. In the example illustrated in FIG. 8, the heating operation is performed immediately before the cleaning operation in the operation state. While the ultrasonic cleaner 26 is waiting for cleaning, the ultrasonic transducer 205 cooled is warmed by a heating operation immediately before the cleaning operation. When the ultrasonic transducer 205 whose temperature has dropped is driven with the cleaning solution contained, the cleaning solution is more likely to scatter at that timing. Therefore, in the heating operation, one of the heating operation methods or a combination thereof is applied as illustrated as (1) to (4). By warming the ultrasonic transducer 205 immediately before the cleaning operation, it is possible to suppress the scattering of the cleaning solution during nozzle cleaning even at a low temperature.

By measuring the ultrasonic transducer 205 and the ambient temperature and controlling the heating operation time according to the temperature, the characteristics of the ultrasonic transducer 205 can be reliably restored to a desired (at room temperature) state. Therefore, also in the control of this embodiment, it is desirable to register the heating time for each ambient temperature in the heating operation table 619 to switch the heating time according to the measured ambient temperature, or to confirm that the state has returned to the same level as at room temperature from the drive current of the ultrasonic transducer 205 using the drive current anomaly detection section 620. In addition, when controlling to switch the heating time by measuring the ambient temperature, it is registered in the heating operation table 619 so that the heating operation is not performed at a high temperature where liquid scattering is unlikely to occur.

FIG. 9 illustrates an example of the determination processing of the heating operation execution of the ultrasonic cleaner control section 613 in the second embodiment. It is confirmed whether the cleaning operation is performed by confirming the cleaning request (S901), and then the ambient temperature (S902) is confirmed. When the temperature measured by the ambient temperature measuring equipment 640 is less than the set threshold temperature, the heating operation (S903) is performed. When the temperature exceeds the threshold temperature, the cleaning operation (S904) is performed without performing the heating operation.

In determining the necessity of heating control, it is not limited to the above, the temperature of the ultrasonic transducer 205 and the piezoelectric device 203 is directly measured, the heating control is turned off when the temperature becomes high, and the heating control may be added only when the temperature becomes low. It is also possible to determine from the drive current waveform whether the heating is insufficient. Furthermore, it is also possible to estimate the temperature drop of the ultrasonic transducer 205 from the history of cleaning operations in the past and the ambient temperature.

Further, as in the first embodiment, in the heating operation, it is desirable to switch the heating time and the number of heating times depending on the ambient temperature. More detailed heating operation parameters (time and number of times) may be determined at the ambient temperature measurement timing (S902).

Third Embodiment

The apparatus configuration of this embodiment is the same as that of the first and second embodiments, but the control method for heating the piezoelectric device 203 is different.

FIG. 10 is a time chart of heating control for preventing the temperature of the ultrasonic transducer in the third embodiment from dropping. In the example illustrated in FIG. 10, the ultrasonic transducer 205 is heated during the reset operation to heat the ultrasonic transducer 205 whose temperature has decreased in the standby state of the automatic analyzer 10. In the reset operation, the water in the cleaning bath 206 is replaced with the cleaning solution. Therefore, the execution timing of the heating operation is performed before the replacement, that is, when the liquid in the cleaning bath 206 is water. This is because even if the liquid is scattered when the liquid in the cleaning bath 206 is water, the problem that the cleaning solution is scattered and precipitated does not occur.

The third embodiment is a method assuming that the ultrasonic cleaner 26 is cooled at night when the automatic analyzer 10 is in a standby state for a long time, and a stable cleaning effect can be obtained in the operation state by heating the ultrasonic transducer 205 for a sufficient time in the reset operation before using the equipment as compared with the case without heating. In this case, by providing a heat insulating material around the ultrasonic transducer 205, the effect of heating the ultrasonic transducer 205 during the reset operation can be maintained. This embodiment is effective in the case of operation with a short operation time or in an environment where the ambient temperature does not become excessively low. In the heating operation, the heating operation parameters such as the heating time may be switched depending on the ambient temperature as in the first and second embodiments. Further, it may be confirmed that the drive current of the ultrasonic transducer 205 has returned to the same level as at room temperature.

Fourth Embodiment

The apparatus configuration of this embodiment differs from those of the first to third embodiments in the flow path configuration and the heating method. FIG. 11 is a time chart of heating control for preventing the temperature of the ultrasonic transducer in the fourth embodiment from dropping. In the example illustrated in FIG. 11, the temperature drop of the ultrasonic transducer 205 is suppressed by supplying hot water to the cleaning bath 206 while the automatic analyzer 10 is in the standby state. This embodiment is effective when the standby state is taken for a long time such as at night when the frequency of use is low. The automatic analyzer 10 has the reaction disk 13 that keeps the water temperature constant for 24 hours, and the above-mentioned flow path for flowing hot water can reduce the number of parts by using, for example, the water temperature control function of the reaction disk 13. As described above, the ultrasonic cleaner 26 has a flow path for supplying the cleaning solution and water to the cleaning bath 206, and a part of the hot water of the reaction disk may be connected to the flow path connected to the cleaning bath 206 to periodically supply hot water. As a method of not directly supplying the hot water of the reaction disk 13, the flow path connected to the cleaning bath 206 can be indirectly warmed by passing the flow path supplied to the cleaning bath 206 through the portion where the reaction disk adjusts the temperature, and it is also possible to heat the water supplied to the cleaning bath 206. However, in order to suppress the temperature change of the reaction disk 13 during the operation, it is desirable to stop the supply to the cleaning bath 206. Therefore, the switching of the flow path is controlled by the change of the apparatus state as a trigger.

As described above, as a control method of the automatic analyzer equipped with the ultrasonic cleaner 26 capable of suppressing the scattering of the cleaning solution generated by the temperature drop of the piezoelectric device 203 provided in the ultrasonic transducer 205 and operating stably, the first to fourth embodiments have been described. These embodiments can be used not only individually but also in combination to improve the effect of suppressing the temperature drop of the piezoelectric device 203. For example, when the third embodiment and the first embodiment or the second embodiment are used in combination, there is a problem that it takes time to heat the ultrasonic transducer 205 at a low drive voltage, whereas it becomes possible to stably use ultrasonic cleaning immediately after the reset operation by the heating operation is added during the reset operation (third embodiment). In particular, in the combination of the first embodiment and the third embodiment, since the drive voltage is always applied to drive the ultrasonic transducer 205 in the first embodiment, the temperature of the piezoelectric device 203 is unlikely to drop even without a heat insulating material, which is effective because it may reduce the number of parts. Further, for example, by supplying hot water as in the fourth embodiment at night, performing a heating operation as in the third at the time of reset, and performing the first embodiment or the second embodiment during the operation, the temperature drop of the ultrasonic transducer 205 can be effectively suppressed.

In the above embodiments, an example of dispensing a sample of the biochemical automatic analyzer has been described. However, the disclosed ultrasonic cleaner can be similarly applied to a dispensing nozzle of another clinical inspection device such as a reagent dispensing nozzle or a dispensing nozzle of an immune automatic analyzer.

LIST OF REFERENCE SIGNS

10 Automatic analyzer
11 Reagent container
12 Reagent disk
13 Reaction disk
14 Reagent dispensing mechanism
15 Sample dispensing mechanism
22 Nozzle
23 Sample container
24 Rack
25 Cell 26 Ultrasonic cleaner
27 Cleaning bath
28 Controller
201 Front mass
202 Back mass
203 Piezoelectric device
204 Bolt
205 Ultrasonic transducer (BLT)
206 Cleaning bath
207 Base
208 Flange
209 Vibration head
210 Tip of vibration head
211 Cylindrical hole
212 Piping
213 Liquid receptacle
214 Drain channel
301,302 Drive current waveform
303,305 Impedance waveform
304,306,307 Resonance point
401 Steady current value
600 GUI
601 Analysis execution operation section
602 Maintenance operation section
603 Cleaner state display section
610 High-order communication processing section
611 Automatic analyzer control section
612 Dispensing mechanism control section
613 Ultrasonic cleaner control section
614 Cleaner heating control method
615 Cleaning operation history
616 Drive control selection section
617 Nozzle cleaning control section
618 Heating control section
619 Heating operation table
620 Drive current anomaly detection section
630 Liquid replacing control section
631 Supplying mechanism
640 Ambient temperature measuring equipment

The invention claimed is:

1. An automatic analyzer, comprising:
a dispensing mechanism having a nozzle for dispensing either a sample or a reagent;
an ultrasonic cleaner to clean the nozzle; and
a controller,
wherein the ultrasonic cleaner includes a cleaning bath, an ultrasonic transducer, and a vibration head which extends from the ultrasonic transducer toward the cleaning bath to cause a tip of the vibration head to be inserted into the cleaning bath, and
wherein the controller is configured to:
perform a heating operation of driving the ultrasonic transducer to heat the ultrasonic transducer at a first voltage, and
perform a cleaning operation of cleaning the nozzle by inserting the nozzle into the cleaning bath and driving the ultrasonic transducer at a second voltage, which is greater than the first voltage, and
wherein the heating operation is performed before the cleaning operation begins and is continued after the cleaning operation ends.

2. The automatic analyzer according to claim 1,
wherein a drive circuit to drive the ultrasonic transducer has a function of tracking a resonance frequency at which an impedance of the ultrasonic transducer becomes a minimum value, and
in the cleaning operation, the controller is configured to: drive the ultrasonic transducer at a resonance frequency at which an impedance of the ultrasonic transducer becomes a minimum value, and
in the heating operation, drive the ultrasonic transducer at a frequency rather than a resonant frequency at which an impedance of the ultrasonic transducer becomes a minimum value.

3. The automatic analyzer according to claim 1,
wherein a drive circuit to drive the ultrasonic transducer has a function of interrupting a passage of current with a predetermined current value or greater through the ultrasonic transducer, and
in the cleaning operation, the controller is configured to:
permit permits the passage of current with the predetermined current value or greater through the ultrasonic transducer, and
in the heating operation interrupt the passage of current with the predetermined current value or greater through the ultrasonic transducer.

4. The automatic analyzer according to claim 3,
wherein the drive circuit to drive the ultrasonic transducer repeatedly turns On/Off an application of drive voltage to the ultrasonic transducer in order to interrupt the passage of current with the predetermined current value or greater to the ultrasonic transducer.

5. The automatic analyzer according to claim 1,
wherein for performing the heating operation, the controller is configured to drive the ultrasonic transducer with the cleaning bath being stored either with no liquid or with water.

6. The automatic analyzer according to claim 1,
wherein the automatic analyzer has an operation state of performing analysis and a standby state of performing no analysis,
wherein the controller is configured to start the heating operation in response to a transition from the standby state to the operation state.

7. The automatic analyzer according to claim 1,
wherein the controller is configured to perform the heating operation prior to performing the cleaning operation on the nozzle in response to a request to clean the nozzle.

8. The automatic analyzer according to claim 6, further comprising a temperature sensor to measure an ambient temperature,
wherein the controller is configured to determine, based on the ambient temperature measured by the temperature sensor, whether the heating operation is necessary.

9. The automatic analyzer according to claim 6,
wherein the controller is configured to:
store a cleaning operation history of the ultrasonic cleaner, and
determine, based on the cleaning operation history, whether the heating operation is necessary.

10. The automatic analyzer according to claim 1,
wherein the automatic analyzer has an operation state of performing analysis and a standby state of performing no analysis, and
wherein the controller is configured to perform performs-the heating operation in a reset operation for a transition from the standby state to the operation state.

11. The automatic analyzer according to claim 10,
wherein the heating operation in the reset operation is performed with the cleaning bath being stored with water.

* * * * *